United States Patent
Ashton et al.

[11] 3,779,487
[45] Dec. 18, 1973

[54] LIGHT WEIGHT CONTOURED LOAD CARRYING STRUCTURE

[76] Inventors: Larry J. Ashton, 3934 Marshal Way, Long Beach; Dale P. Abildskov, 900 Bejay Pl., San Pedro, both of Calif.

[22] Filed: Apr. 19, 1971

[21] Appl. No.: 134,973

[52] U.S. Cl............... 244/123, 29/455 R, 161/139, 416/230
[51] Int. Cl. ............................................... B64c 3/24
[58] Field of Search............ 244/123, 117 R, 117 A, 244/129 R, 124, 125, 133; 161/139, 127, 161; 156/212-215; 29/455 R, 455 LM, 460, 471.1; 416/187, 226, 230, 241 A

[56] References Cited
UNITED STATES PATENTS

| | | | |
|---|---|---|---|
| 3,229,935 | 1/1966 | Bellanca | 244/123 |
| 3,028,292 | 4/1962 | Hinds | 244/123 X |
| 2,410,609 | 11/1946 | Pecker | 244/123 |
| 1,930,285 | 10/1933 | Robinson | 244/125 X |
| 2,540,482 | 2/1951 | Hervey | 244/123 |
| 3,176,775 | 4/1965 | Clemens | 244/123 X |
| 2,602,614 | 7/1952 | Cole | 244/123 |
| 3,450,374 | 6/1969 | Moore | 244/123 X |
| 3,542,079 | 11/1970 | Kelly | 416/230 |
| 3,645,829 | 2/1972 | Palfreyman et al. | 244/123 |

FOREIGN PATENTS OR APPLICATIONS

| | | | |
|---|---|---|---|
| 720,956 | 12/1954 | England | 416/187 |

Primary Examiner—Duane A. Reger
Assistant Examiner—Galen L. Barefoot
Attorney—Fulwider, Patton, Rieber, Lee & Utecht

[57] ABSTRACT

A lightweight load carrying foil structure including a plurality of elongated filament wound fiberglass tubular members disposed in side by side relationship and varying in cross section from one member to the other to have the opposite lateral sides thereof cooperate in defining the contour of a foil cross section that progressively increases in thickness from the leading edge of the foil cross section to form an intermediate portion defining a maximum thickness and to then progressively decrease in thickness to terminate in a relatively thin trailing edge. Fiberglass skin is stretched over the tubular members and cooperates therewith to form longitudinal cavities between such members. A filler foam fills the cavities and is held in place by the fiberglass skin to contain the members against bending when a moment is applied thereto.

10 Claims, 10 Drawing Figures

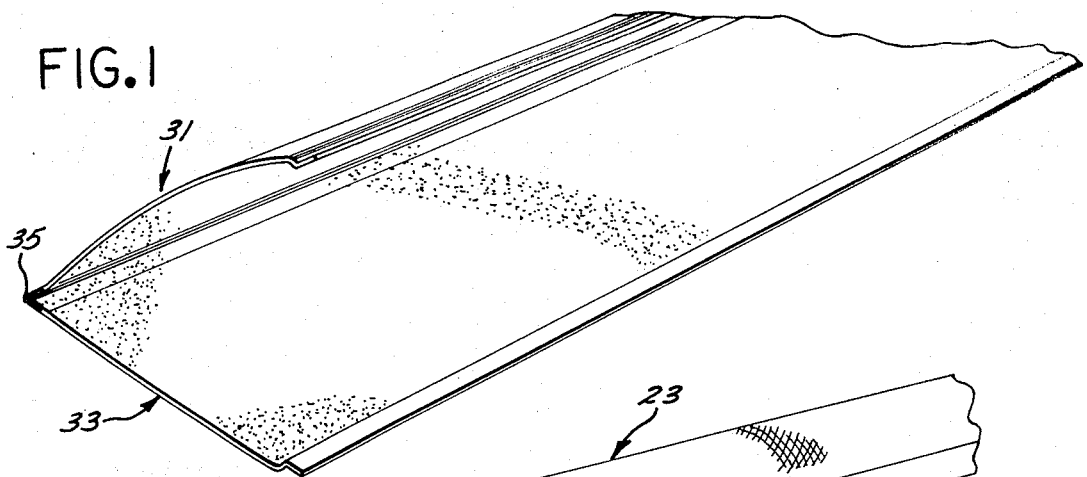
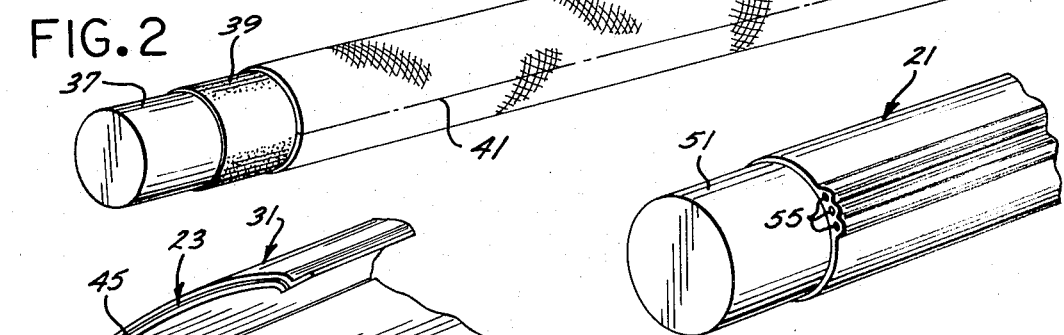
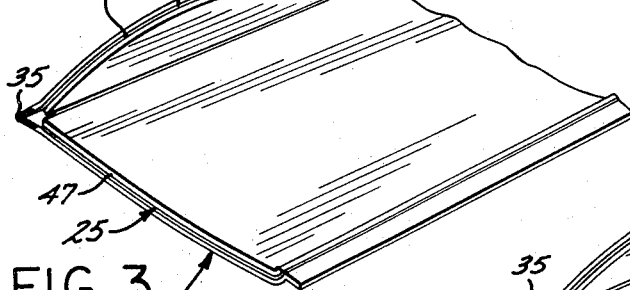
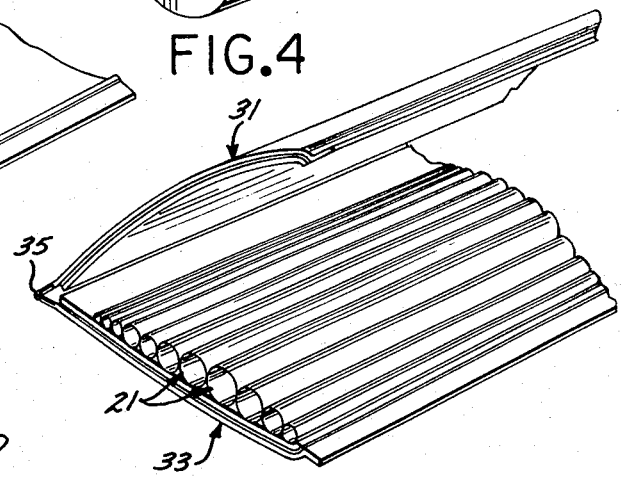
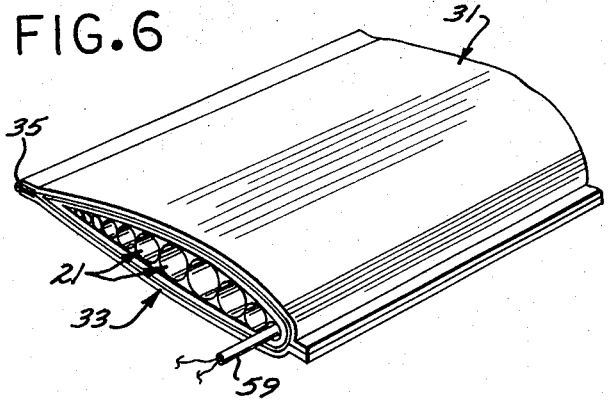

LIGHT WEIGHT CONTOURED LOAD CARRYING STRUCTURE

BACKGROUND OF THE INVENTION

1. Field of the Invention

The present invention relates to a lightweight contoured structure such as an airfoil or hydrofoil.

2. Description of the Prior Art

Conventional airfoils such as airplane wings or helicopter rotor blades are frequently constructed from a series of ribwork generally defining the overall contour and covered with aluminum skin which is riveted to such ribwork. Contoured structures of this type suffer the shortcoming that they are relatively expensive to manufacture and do not have good load carrying characteristics. Many efforts have been made to improve conventional wing structures of this type. Applicants are aware of the following U. S. Patents directed to this subject matter:

2,593,714 — R.H. Robinson
2,749,061 — W.A. Franz
2,773,792 — R.J. Nebesar
3,105,557 — V.F. Wigal
3,273,833 — L.J. Windecker
3,396,922 — L.J. Windecker
3,349,157 — J.T. Parsons However, applicants are not aware of any lightweight contoured filament reinforced matrix structure which incorporates a plurality of co-extensive tubular members disposed in side-by-side relationship and of sufficient cross section to extend substantially from one side to the other of such structure.

SUMMARY OF THE INVENTION

The lightweight load carrying contoured structure of present invention is characterized by a plurality of co-extensive tubular members disposed in side-by-side relationship and of sufficient cross section to extend from one side to the other of the composite structure and terminating in opposite sides with respective extremities that cooperate to form a line defining the contour for the respective opposite sides of such structure. The tubular members are covered by skin means and stiffening means is provided for cooperating with such tubes to resist buckling thereof.

An object of the present invention is to provide a lightweight load carrying structure of the type described which may employ filament wound tubular members.

Another object of the present invention is to provide a load carrying structure of the type described wherein the tubular members form a plurality of redundant load carrying elements which provide multiple load paths.

Another object of the present invention is to provide a load carrying structure of the type described wherein the tubular members define passageways to act as fuel tanks or for receipt of electrical conduits and the like.

A still further object of the present invention is to provide a load carrying structure of the type described wherein the tubular members include high tensile and/or high modulus filaments incorporated in opposite sides thereof for resisting transverse bending of such members.

These and other objects are the advantages of the present invention and will become apparent from a consideration of the following detailed description when taken in conjunction with the accompanying drawings.

BRIEF DESCRIPTION OF THE DRAWINGS

FIG. 1 is a perspective view of a mold in which contoured load carrying structure embodying the present invention may be formed;

FIG. 2 is a perspective of a mandrel having filament windings thereon which may be used in forming the skins in a load carrying structure of present invention;

FIG. 3 is a perspective view of the mold shown in FIG. 1 with a skin formed by the windings shown in FIG. 2 positioned therein;

FIG. 4 is a perspective view of a mandrel having a filament wound tube therein which may be incorporated in a load carrying structure embodying the present invention;

FIG. 5 is a perspective view similar to FIG. 3 and with a plurality of tubular members as shown in FIG. 4 positioned in side-by-side relationship on the lower half of the mold;

FIG. 6 is a perspective view similar to FIG. 5 but with the mold closed;

DESCRIPTION OF THE PREFERRED EMBODIMENT

Figure 7:
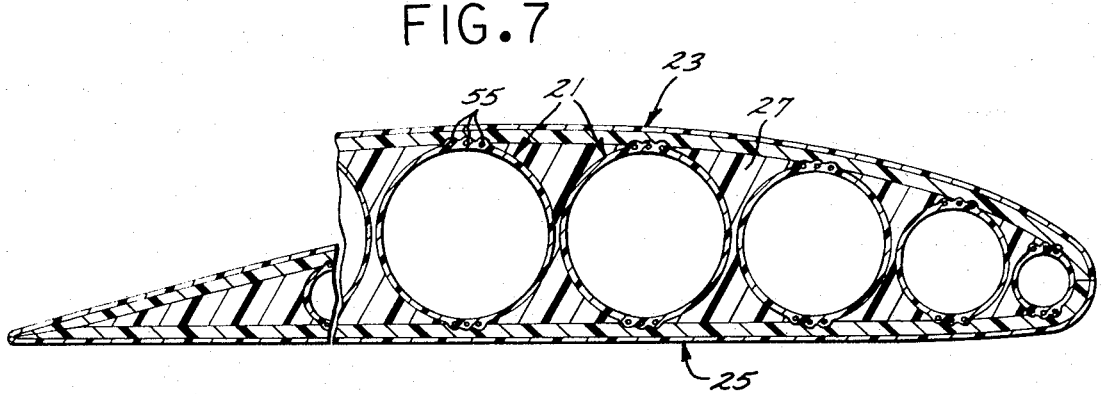
FIG. 7 is a broken transverse sectional view of a lightweight load carrying structure embodying the present invention.

Referring to FIG. 7, the contoured lightweight load carrying structure of present invention may be in the form of an airfoil and includes, generally, a plurality of co-extensive filament wound tubular members 21 of different cross sectional size and disposed in side-by-side relationship. In the particular embodiment shown the tubular members 21 are sized to cause the opposite transverse extremities thereof to define the contours of opposite sides of an airfoil. The tubular members 21 are covered on their top and bottom sides by respective upper and lower skins 23 and 25 and the space between adjacent tubular members 21 is then filled with a stiffening core material such as a conventional cellular foam 27. The resultant structure provides highly desirable load carrying characteristics and is relatively lightweight thereby providing the general qualities which are highly desirable for use in aircraft structures.

The clam shell type mold shown in FIG. 1 may be utilized in manufacturing the lightweight load carrying structure shown in FIG. 7 and includes respective upper and lower halves 31 and 33 which are connected together along one edge by means of a piano-type hinge 35. The mold halves 31 and 33 may be reinforced to positively maintain the desired contour and are polished on their interior to provide the desired surface smoothness for the airfoil skin.

Referring to FIG. 2, the upper airfoil skin 23 is formed on a cylindrical mandrel 37. The mandrel 37 has a carrier wrapped thereon which may be in the form of a large sheet of heavy waxed paper 39. The skin 23 may be wound by a conventional filament winding device and is preferably wound in a plurality of plies of approximately 0.012 inches thick. The plies are preferably applied in alternate patterns with one pattern being wound circumferentially and the next pattern being wound at 45° to the circumference of the mandrel 37.

After forming of the skin 23 is completed, such skin and the release paper 39 is slit longitudinally at 41 and the combined skin and release paper 39 transferred to the upper mold half 31. It will be realized that the mold halves 31 and 33 are pre-coated with a gel coat and the windings of the skin are rubbed into such gel coat and the release film removed therefrom to leave the windings of the skin 23 in position. The lower skin 25 is formed in a similar manner and placed on the gel coat in the lower mold half 33. An alternate approach would be to make the skins from fiber glass fabric impregnated by resin.

Referring to FIG. 3, with the upper and lower skins 23 and 25 in position respective upper and lower sheets of core material in the form of impact resistant foam or honeycomb sheets 45 and 47 are placed over the upper and lower skins 23 and 25. The sheets 45 and 47 are typically approximately ¼ inch thick. Flexible plastic bags are then fitted over the respective mold halves 31 and 33 and a vacuum drawn therein to press the honeycomb sheets 45 and 47 firmly against the respective upper and lower skins 23 and 25 to assure that such sheets take the shape of the respective mold halves and to remove any pockets of air that may have formed thereunder. The composite skin structure is then allowed to cure before the tubular members 21 are placed in position.

Referring to FIG. 4, the tubular members 21 may be formed on a mandrel 51 similar to the mandrel 37 and may also be wound by a conventional filament winding machine. For the particular construction shown the mandrels are tapered to provide for convenient removal of the tubular members and to form such tubular members with a taper to provide a taper longitudinal in the structure formed. Again, the windings are preferably in plies with part of the plies being formed by circumferential windings sandwiched between plies formed by windings oriented at an angle of 45° to the circumference to thereby provide circumferential and spiral filaments exhibiting desirable load carrying capabilities.

Extending longitudinally on opposite sides of the tubular members 21 and integrated therein are a plurality of high tensile strength and stiffness fibers 55 which are positioned on the top and bottom sides of the wings to act under tension and compression to carry the longitudinal bending loads. The reinforcing fibers 55 may be in the form of ribbons constituting bundles of individual strands 55.

It is noted that the mandrel 51 tapers from left to right as shown in FIG. 4 to thereby provide slightly tapered tubular members 21 wherein the composite wing structure will taper slightly from its base to its wing tip.

As best seen in FIGS. 5 and 7, the central tubular members 21 are relatively large in cross section and the tubular members on opposite sides thereof become progressively smaller in cross section with those to the left of the central tubular member becoming smaller in cross section at a more gradual rate than those on the right side to thereby provide a gradual taper which forms the trailing edge of the wing.

After the tubular members 21 have been placed in position as shown in FIG. 5 and the mold closed and locked as shown in FIG. 6, the stiffening foam 27 is poured in place. Such foam 27 may conveniently be poured by inserting the delivering hose down the cavities defined by passages formed between the respective adjacent tubular members 21 and skin 23 and spraying the foam from such hose and slowly retracting the hose to fill such passages. When all passageways formed between the respective tubular members have been filled and the structure allowed to cure, the resultant structure will have the desired contour as dictated by the mold and will be relatively lightweight.

Further, such structure will provide highly desirable load carrying characteristics in that upwardly acting loads applied to the wing which produce bending moments will be resisted by cooperation of the respective tubes 21 and the stiffening foam 27 which prevents buckling or collapse of such tubes. Additionally, the longitudinal fibers 55 will be placed under stress and will be highly effective in resisting such bending.

Additionally, forces acting upwardly along the lower surface of the airfoil will be transferred directly to the tubes 21 thereby substantially reducing the normally high shear forces experienced in conventional riveted wing structure. A further feature of this structure is the capability of all the tubular members 21 to cooperate in resisting transverse moments applied to the overall wing structure and the formation by each tubular member of a passageway which may receive electrical conduits 59 (FIG. 6), de-icing heaters or even act as fuel tanks themselves.

Figure 8:
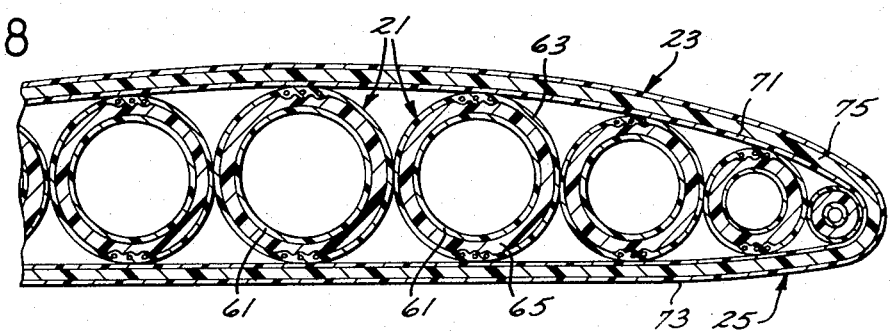
FIGS. 8, 9 and 10 are transverse sectional views similar to FIG. 7 but showing respective first, second and third modifications of the load carrying structure shown in FIG. 7.

The lightweight contoured structure shown in FIG. 8 is similar to that shown in FIG. 7 except that the tubular members 21 have respective interior tubes 61 telescoped thereinto and cooperating therewith to define respective annular passages 63 for receipt of stiffening foam 65. Additionally, the respective upper and lower skins 23 and 25 cooperate to define the outside contour and have respective interior skins 71 and 73 disposed co-extensive therewith and cooperating therewith to form a peripheral chamber for receipt of stiffening foam 75 which is effectively sandwiched between the resultant inner and outer skins to act as a stiffening means to prevent buckling. Consequently, the relatively thin walled tubular members 21 and 61 and the thin walled skins 23, 25, 71 and 73 cooperate with the stiffening foam 65 and 75 to provide a relatively lightweight structure which is formed to a desired contour and exhibits highly desirable load carrying characteristics.

Figure 9:
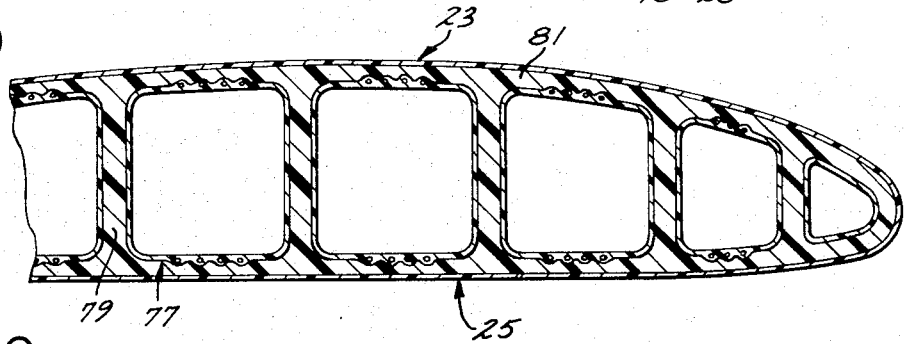

FIG. 9 depicts a lightweight contoured load carrying structure which incorporates tubular members, generally designated 77, that have a cross section in the form of modified squares and are disposed in side-by-side relationship but spaced apart a selected distance to form vertically extending passageways for receipt of stiffening foam 79 which acts as partitions. Further, it will be noted that the tubular members 77 are of sufficient depth to provide a space between their upper and lower sides and the respective skins 23 and 25 to cooperate in forming a peripheral chamber for receipt of stiffening foam 81. Consequently, during construction the tubular members and pre-cut stiffening foam may be placed in the skins 23 and 25 and integrally bonded together.

Figure 10:
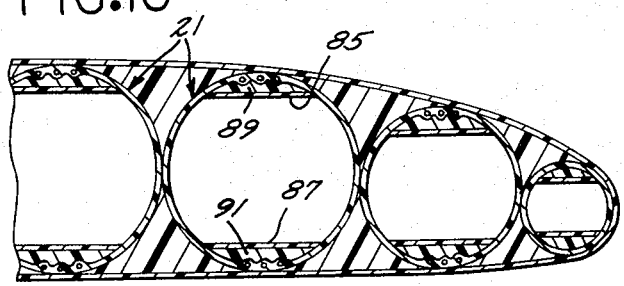

The lightweight load carrying structure shown in FIG. 10 is similar to that shown in FIG. 7 except that chordal walls 85 and 87 are formed in the upper and lower sides of the tubular members 21 to define respective chambers for receipt of stiffening foam 89 and 91 which acts to assist in resisting bending of the tubes and skin.

From the foregoing it will be apparent that applicants have provided a new and useful contoured load carrying structure which may conveniently be utilized in forming airfoils and hydrofoils and the like. The design characteristics throughout the length of a foil may easily be varied to correspond with the expected loads at different points therealong. By employing conventional fiber glass molding procedures the consequent resultant contour of the structure may be conveniently formed to a wide variety of specified designs. Thus, it will be appreciated that various weight distributions throughout the cross sections of airfoils, such as helicopter rotor blades, may conveniently be attained by merely varying the contour of the tubes utilized and the various wall thickness and weighting thereof. Additionally the tubes act as redundant load paths along the structure thereby enabling the structure to withstand the destruction of a portion thereof without catastrophic failure of the entire structure as is the case with many conventional wings.

Various modifications and changes may be made with regard to the foregoing without departing from the spirit of the invention.

We claim:

1. A lightweight foil structure for mounting in a cantalever arrangement comprising:
   a plurality of elongated load carrying filament wound fiberglass tubular members disposed in side by side relationship and varying in cross section from one to the other to have the opposite lateral sides thereof cooperate in defining the contour of the foil cross section that progressively increases in thickness from the leading edge of said foil cross section to form an intermediate portion defining a maximum thickness and to then progressively decrease in thickness to terminate in a relatively thin trailing edge;
   fiberglass retaining means secured over said tubular members and cooperating therewith to form longitudinal cavities, said retaining means defining the external cross-section of said foil structure; and
   lightweight filler means filling said cavities to closely fit the peripheries of said tubular members and having sufficient resistance to compression under normal operating conditions to provide for transfer of loads from said retaining means to said tubular means to cause said tubular means to cooperate with said retaining means in supporting said tubular members against buckling whereby lifting loads applied to the tip end of said structure as mounted cantaleverly which result in longitudinal bending moments will be resisted by said filament wound tubular members and buckling of said members will be resisted by said filler means in cooperation with said retaining means.

2. A lightweight structure as set forth in claim 1 wherein:
   said tubular members are arcuate in cross section; and
   said retaining means includes skin means stretched over said tubular members to cooperate with said tubular members to form said cavities.

3. A lightweight structure as set forth in claim 1 wherein:
   said tubular members are circular in cross section and include a layer of circumferential filaments and a layer of spiral filaments.

4. A lightweight structure as set forth in claim 1 wherein:
   said filler means is in the form of cellular foam.

5. A lightweight structure as set forth in claim 1 wherein:
   said tubular members are circular in cross section.

6. A lightweight structure as set forth in claim 1 that includes:
   elongated reinforcing members projecting down opposite sides of said tubular members to cooperate in supporting said members against bending.

7. A lightweight structure as set forth in claim 1 wherein:
   said tubular members include elongated reinforcing members running down said one side thereof for supporting said tubular members against bending.

8. A lightweight structure as set forth in claim 1 wherein:
   said tubular members are arcuate in cross section.

9. A lightweight structure as set forth in claim 1 wherein:
   said tubular members are tapered from one end to the other.

10. A lightweight structure as set forth in claim 1 wherein:
    said tubular members are formed with walls having a thickness less than one tenth of an inch.

* * * * *